United States Patent

[11] 3,614,121

[72] Inventor Lloyd J. Wolf
 2425 Irving Blvd., Dallas, Tex. 75207
[21] Appl. No. 844,325
[22] Filed July 24, 1969
[45] Patented Oct. 19, 1971

[54] TANDEM AXLE SUSPENSIONS
 10 Claims, 6 Drawing Figs.
[52] U.S. Cl. .................................................. 280/104.5,
 267/19
[51] Int. Cl. ...................................................B60g 19/02,
 B60g 19/08
[50] Field of Search .......................................... 280/104.5,
 104.5 A; 267/19

[56] References Cited
 UNITED STATES PATENTS
 2,614,863 10/1952 Schramm .................. 280/104.5
 2,869,889 1/1959 Dickison .................. 280/104.5 A FOREIGN PATENTS
 646,448 6/1937 Germany .................. 280/104.5

Primary Examiner—Philip Goodman
Attorney—Bedell and Burgess

ABSTRACT: Tandem axle suspensions comprising transversely spaced pairs of bellcranks fulcrumed on adjacent transverse axes to a vehicle frame and having platelike substantially horizontal arms extending longitudinally in opposite directions from their fulcrums, and upright arms having means resiliently biasing the upright arms away from each other through axles secured to corresponding outer ends of the horizontal arms, the horizontal arms lying in longitudinal substantially vertical planes and being torsionally sufficiently flexible to permit transverse tipping of the through axles for operation over irregular surfaces. In one embodiment of the invention, the upright arms are rigid members, with longitudinally acting springs compressed between their upper ends, while in another embodiment the upright arms are semielliptic leaf springs rigidly secured at their lower ends to the horizontal arms and connected by a short strut to each other at their upper ends.

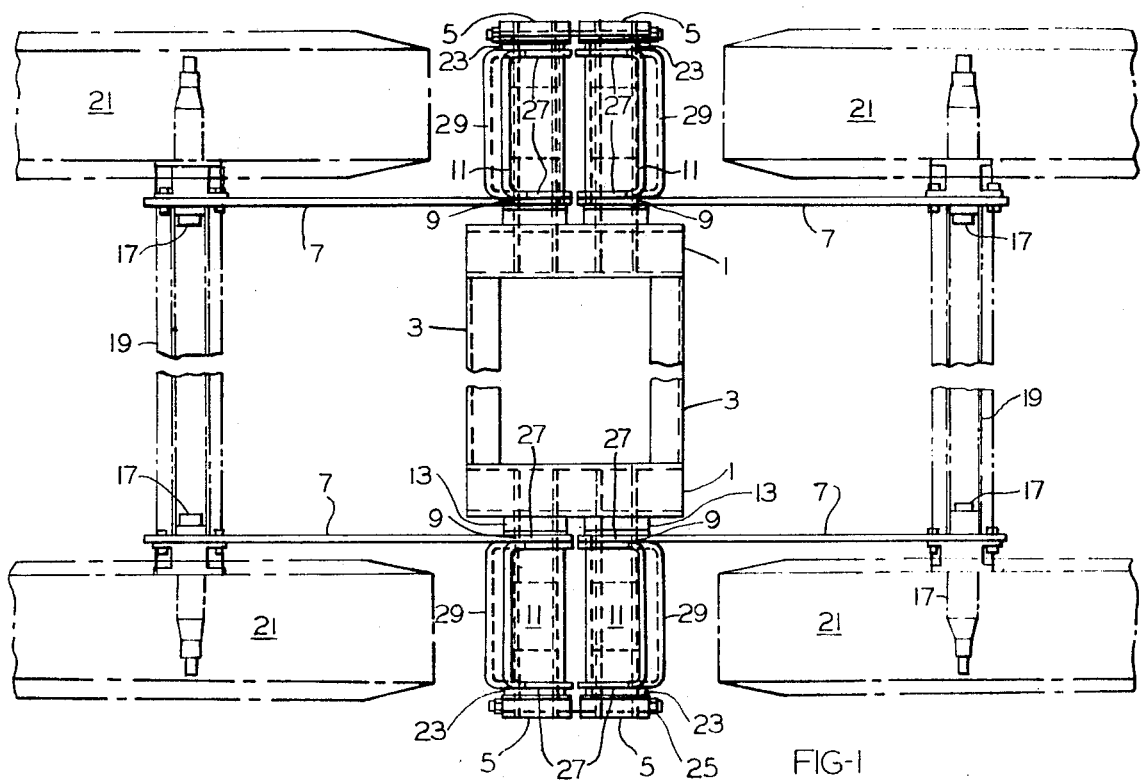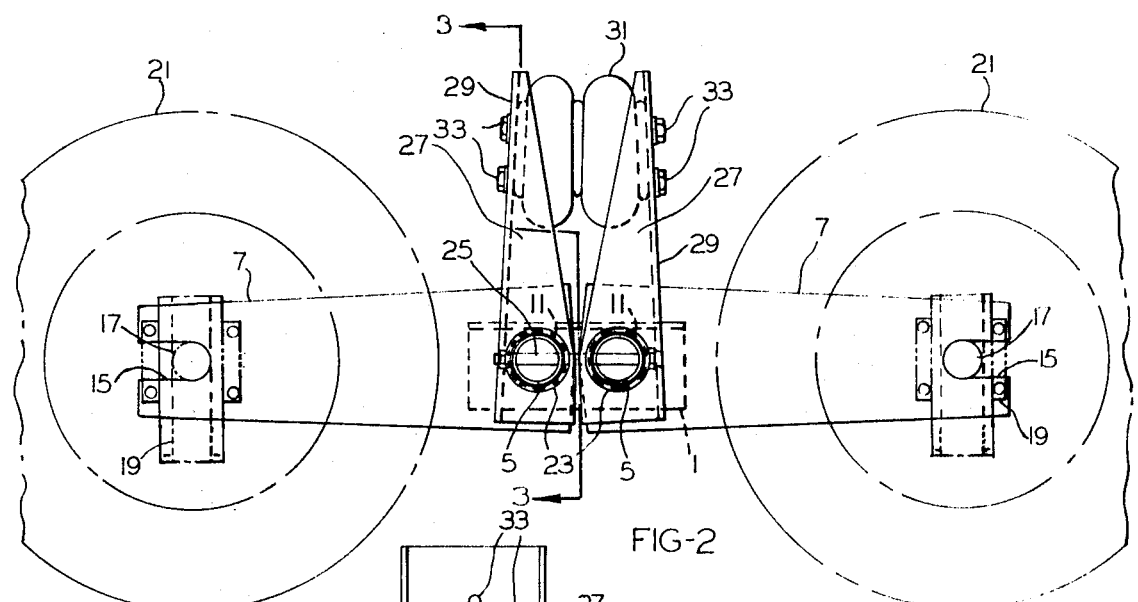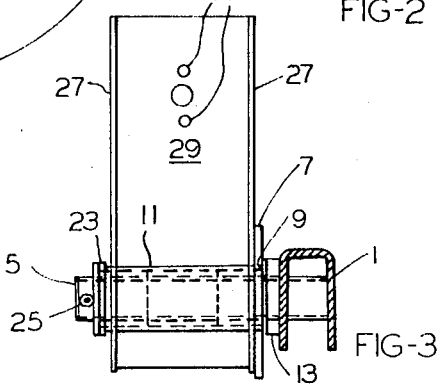

INVENTOR
LLOYD J. WOLF
BY Bedell & Burgess
ATTORNEYS

TANDEM AXLE SUSPENSIONS

BACKGROUND OF THE INVENTION

1. Field of the Invention

The invention relates to land vehicles and consists particularly in a tandem axle suspension in which the individual axles are mounted on bellcranks.

2. The Prior Art

In previously disclosed bellcrank suspensions for tandem axles, the bell crank axle support arms have been rigid members. If through axles are secured to the rigid bellcrank arms, independent vertical movement of the wheels on each axle necessitated by uneven road surfaces will be prevented by the rigidity of the structure. Attempts have been made to correct this condition by substitution of stub axles for through axles, but although the use of stub axles makes possible the necessary independent wheel movement, the stub axle structure is inherently weaker than a through axle structure.

SUMMARY OF THE INVENTION

The invention provides an opposed bellcrank type of tandem axle suspension having through axles with means for achieving independent vertical movement of all wheels. This objective is achieved by providing torsionally flexible, but otherwise rigid, horizontal axle mounting arms on the bellcranks.

BRIEF DESCRIPTION OF THE DRAWINGS

FIG. 1 is a plan view of one embodiment of the invention.

FIG. 2 is a side elevational view of the embodiment illustrated in FIG. 1.

FIG. 3 is a fragmentary transverse vertical sectional view along line 3—3 of FIGS. 1 aNd 2.

DESCRIPTION OF THE PREFERRED EMBODIMENTS

Figure 4:
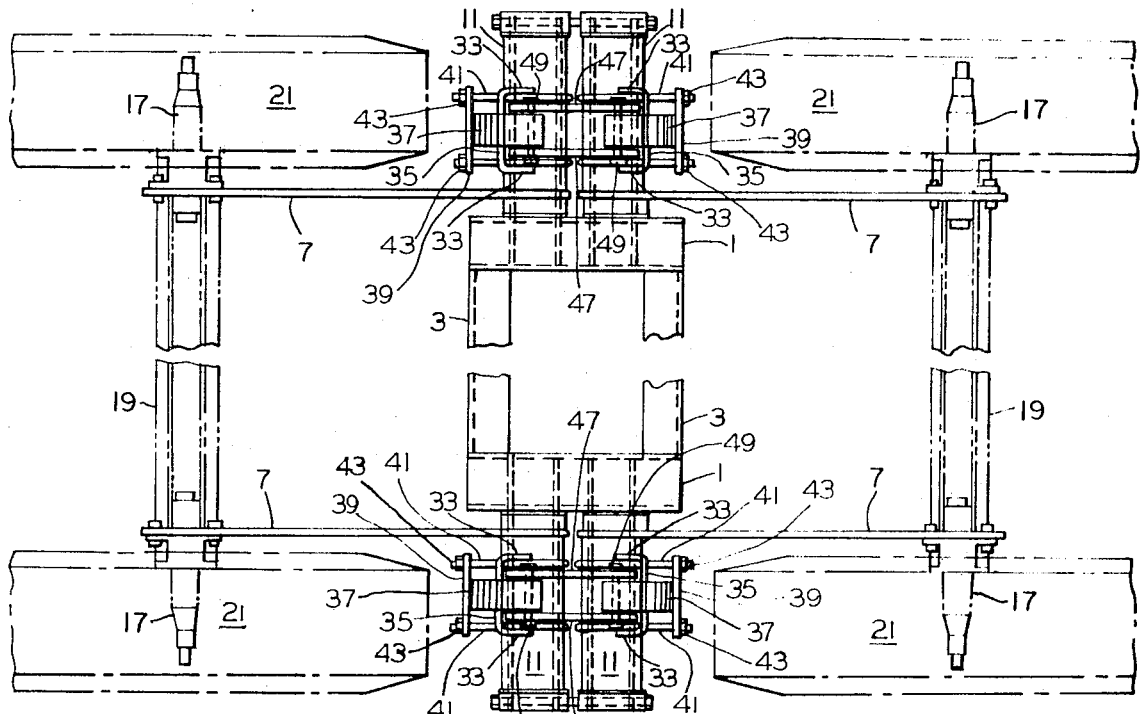
FIG. 4 is a plan view of a second embodiment of the invention.

The numeral 1 refers to a pair of transversely spaced longitudinally extending inverted channel mounting elements, connected to each other by a pair of longitudinally spaced transversely extending transom members 3, and arranged to be rigidly connected to a supported vehicle underframe structure, not shown.

At each side of the suspension, a pair of tubular trunnions 5 are rigidly secured to, and protrude transversely outwardly from, mounting elements 1, in slightly spaced relation longitudinally of the vehicle with respect to each other, but at the same level.

Radial arms each consisting of an elongated torsionally flexible steel plate 7 are circularly apertured at their inner ends at 9 and tubular bearings 11 are welded in the apertures, extending transversely outwardly from the vertical planes of plates 7. Bearings 11 are of sufficient diameter to pivotally receive trunnions 5 which mount collars 13 adjacent mounting members 1, and radial arms 7, 11 are rotatably mounted on trunnions 5 with plates 7 abutting collars 13 and thereby spaced from mounting members 1. Arms 7, 11 are mounted on trunnions 5 to point, longitudinally of the vehicle, away from each other.

The outer ends of arm plates 7 are inwardly slotted as at 15 to receive the inner ends of wheel spindles 17 on the upright ends of through axles 19 which are rigidly secured to the outer ends of radial plates 15.

Pneumatic tired wheels 21 of conventional construction are rotatably mounted on wheel spindles 17 in the usual manner.

For holding bearings 11 in assembled relation with trunnions 5, collars 23 are mounted on the outer end portions of trunnions 5 with their inner faces slidably abutting the outer ends of bearings.

In turn, a bolt 25 passes diametrally through the outer end portions of the pairs of trunnions 5 at each side of the suspension to stabilize the trunnions against rotation, which would tend to weaken their connections to mounting members 1, but also to lock collars 23 on the trunnions and thereby maintain arm 7, 11 in assembled relation to trunnions 5.

Figure 5:
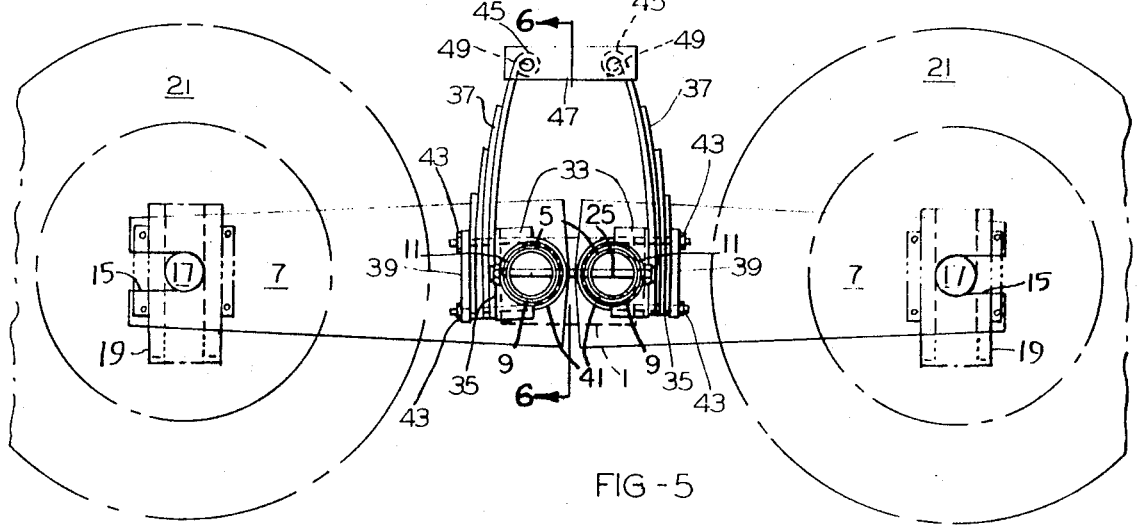
FIG. 5 is a side elevational view of the embodiment illustrated in FIG. 4.
Figure 6:
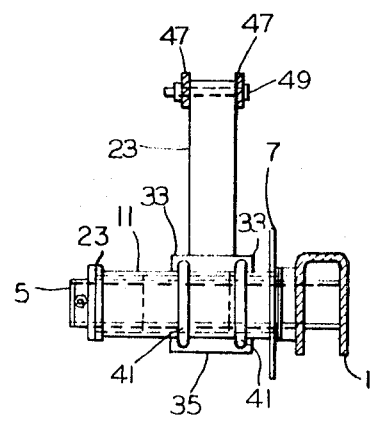
FIG. 6 is a transverse vertical sectional view along line 6—6 of FIGS. 4 and 5.

The structure heretofore described is common to both embodiments of the invention and the same reference characters will be used to indicate corresponding elements in the embodiment of FIGS. 4–6.

In the embodiment of FIGS. 1–3, a pair of upstanding channel section arms are secured to bearings 11 and radial arm plates 7, with the lower ends of their flanges 27 surrounding and secured to bearings 11 and the lower ends of their inner flanges 27 secured to plates 7 to form, with the latter, bellcranks having substantially horizontal and vertical arms and fulcrumed on trunnions 5.

Upstanding channel arms include transverse webs 29, and longitudinally acting compression springs, preferably two-convolution flexible wall pneumatic cushions 31 are interposed between the upper end portions of webs 29, being secured thereto by bolts 33, so that, when filled with compressed gas, such as air, cushions 31 will resiliently oppose pivotal movement of upstanding arms 27, 29 toward each other and consequently cushion upward movement of the wheels. On uneven surfaces differential equalizing movement of the wheels at opposite sides, requiring tilting of the axles transversely of the vehicle, will be permitted by differential pivoting of corresponding arms 7, 11 about their respective trunnions 5 and by torsional flexing of plates 7 about their longitudinal axes.

The second embodiment of the invention, illustrated in FIGS. 3–6, differs from the first in the construction of the upright arms and their connection to each other. In the second embodiment, short channel section mounting blocks having their flanges 33 semicircularly apertured are rigidly secured outward of plates 7 to tubular bearings 11 with their webs 35 substantially vertical and tangent to the surfaces of bearings 5 remote from each other.

Substantially upright semielliptic leaf springs 37 are secured against webs 35 by rectangular clamping plates 39 each of which is held against the outer plates of one of the springs 37 by a pair of U-bolts 41 which pass around tubular bearings 11 at both sides of the spring and pass through the corners of clamping plates 39, which are secured by nuts. Springs 37 are curved toward each other longitudinally of the suspension.

At their upper ends, leaf springs 37 are formed with loops 45 and a pair of longitudinally extending tie bars or links 47 are apertured at their opposite ends to permit bolts 49 to pass through their respective ends and spring loops 45, thus providing means interposed between springs 37 which form the upstanding arms of bellcranks, the longitudinal arms of which are plates 7.

With the construction thus described any upward movement of any of the wheels resulting from ground irregularities will be resiliently opposed by the resistance to distortion of leaf springs 37 opposing each other through links 47, but will be accommodated by the yielding of the springs. Differential vertical movements of the wheels at opposite sides will be accommodated by the ability of plates 7 to flex torsionally and thereby permit differential tipping of the axles transversely of the suspension.

I claim:

1. A tandem axle suspension for a vehicle comprising a pair of transverse axis pivot elements fixed to each side of the vehicle in closely spaced side-by-side relation longitudinally of the vehicle, a pair of arms mounted at their inner ends respectively on said pivot elements at each side and extending longitudinally therefrom in opposite directions, a pair of wheel mounting transverse through axles rigidly secured to corresponding outer ends of said longitudinally extending arms at opposite ends of the vehicle, upstanding elements rigidly secured respectively to the adjacent inner ends of each arm, means interposed between the upper portions of said upstanding elements to oppose their pivotal movements toward each other, said longitudinally extending arms being vertically rigid but torsionally flexible plates whereby to freely accommodate transverse tipping of said axles.

2. A tandem axle suspension according to claim 1 wherein said longitudinally extending arm plates are of vertically elongated cross section.

3. A tandem axle suspension according to claim 1 wherein said upstanding elements are rigid arms, said interposed means comprising a compression spring device.

4. A tandem axle suspension according to claim 3 wherein said spring device comprises a flexible wall pneumatic cushion.

5. A tandem axle suspension according to claim 1 wherein said upstanding elements at each side are leaf springs with their lower ends located outwardly radially of said arms from said pivot elements and with their upper ends biased toward each other.

6. A tandem axle suspension according to claim 5 wherein said interposed elements at each side are longitudinally extending links pivotally connected at their ends to the upper ends of said leaf springs.

7. A tandem axle suspension according to claim 5 wherein said pivot elements are cylinders projecting outwardly from the vehicle sides, said longitudinal arms being provided with transversely outwardly projecting tubular elements pivotally surrounding said cylinders.

8. A tandem axle suspension according to claim 7 wherein said leaf springs are secured directly to said tubular elements outwardly of said longitudinal arms.

9. A tandem axle suspension according to claim 2 wherein said pivot elements are cylindrical members projecting transversely outwardly from the vehicle sides and said longitudinal arms are formed with transversely outwardly extending tubes pivotally surrounding said cylindrical elements.

10. A tandem axle suspension according to claim 9 wherein a shoulder is provided on each said cylindrical element inwardly of said arms to position said tubes axially of said cylindrical elements, and a collar is mounted on each of said cylindrical elements outwardly of both said tubes, there being a common bolt extending diametrally of both said cylindrical elements and said collars to lock the same on said cylindrical elements and to tie the outer ends of said cylindrical elements to each other against torsional forces applied to them by said tubes.